(12) United States Patent
Blue et al.

(10) Patent No.: US 12,552,531 B2
(45) Date of Patent: Feb. 17, 2026

(54) AERIAL DELIVERY VEHICLE

(71) Applicant: Freedom Flight Works, Inc., San Diego, CA (US)

(72) Inventors: Austin Blue, San Diego, CA (US); Scott Duffy, San Diego, CA (US); Stephan Veillard, San Diego, CA (US)

(73) Assignee: Freedom Flight Works, Inc., San Diego, CA (US)

( * ) Notice: Subject to any disclaimer, the term of this patent is extended or adjusted under 35 U.S.C. 154(b) by 0 days.

(21) Appl. No.: 18/746,003

(22) Filed: Jun. 17, 2024

(65) Prior Publication Data

US 2025/0019073 A1    Jan. 16, 2025

Related U.S. Application Data

(63) Continuation-in-part of application No. 18/228,489, filed on Jul. 31, 2023.

(60) Provisional application No. 63/521,319, filed on Jun. 15, 2023, provisional application No. 63/393,285, filed on Jul. 29, 2022.

(51) Int. Cl.
| | | |
|---|---|---|
| *B64C 31/02* | (2006.01) | |
| *B64C 19/00* | (2006.01) | |
| *B64D 1/08*  | (2006.01) | |
| *B64D 7/00*  | (2006.01) | |

(52) U.S. Cl.
CPC ............. *B64C 31/02* (2013.01); *B64C 19/00* (2013.01); *B64D 1/08* (2013.01); *B64D 7/00* (2013.01)

(58) Field of Classification Search
CPC ..... B64C 31/02; B64C 31/028; B64C 31/036; B64C 39/024; B64C 39/026; B64D 1/02; B64D 1/08; B64U 2101/60; B64U 2101/64; B64U 2101/67; B64U 2201/10; B64U 2201/104; B64U 2201/20

See application file for complete search history.

(56) References Cited

U.S. PATENT DOCUMENTS

| | | | |
|---|---|---|---|
| 6,338,457 B1* | 1/2002 | Hilliard .................. | B64D 17/80 |
| | | | 244/152 |
| 8,538,605 B1* | 9/2013 | Riley ....................... | B64D 1/08 |
| | | | 701/3 |
| 10,059,436 B1* | 8/2018 | Robertson ............... | B64C 25/36 |
| 2002/0100834 A1* | 8/2002 | Baldwin ................. | B64C 17/04 |
| | | | 244/12.4 |

(Continued)

OTHER PUBLICATIONS

Maj. David Kurle, USAF, Bagram C-130s Use High-Tech Cargo Delivery System, Sep. 6, 2006, www.defense.gov—http://www.defense.gov/news/newsarticle.aspx?id=707 Internet Archive—https://web.archive.org/web/20120714145328/http://www.defense.gov/news/newsarticle.aspx?id=707 (Year: 2006).*

*Primary Examiner* — Loren C Edwards
(74) *Attorney, Agent, or Firm* — Tanner IP, PLLC

(57) ABSTRACT

Aerial delivery systems are described including a propulsion unit, a deployable parafoil attached to the propulsion unit, a control/navigation unit operably connected to the parafoil, and a support truss connected to the propulsion unit. The system may be configured to attach to and transport a payload. The propulsion unit may be configured to provide thrust to the aerial delivery system while the parafoil is deployed and the control/navigation unit may be configured to steer the parafoil while deployed.

20 Claims, 8 Drawing Sheets

(56) References Cited

U.S. PATENT DOCUMENTS

| | | | |
|---|---|---|---|
| 2004/0169111 A1* | 9/2004 | Christof | B64D 17/34 244/152 |
| 2012/0104151 A1* | 5/2012 | Mccann | B64D 1/08 244/137.4 |
| 2017/0160750 A1* | 6/2017 | Kimchi | B64D 1/12 |

* cited by examiner

AERIAL DELIVERY VEHICLE

This application claims priority to U.S. App. Ser. No. 63/521,319 filed Jun. 15, 2023, and is a continuation in part of U.S. application Ser. No. 18/228,489 filed Jul. 31, 2023, which claims priority to U.S. App. Ser. No. 63/393,285 filed Jul. 29, 2022, the entire contents of all of which are hereby incorporated herein by reference.

The present subject matter generally relates to aerial delivery vehicles. These may include, for example, a Long Range Precision Aerial Delivery System (LRPADS) as described herein.

In skies where air dominance has not been secured the option for direct, unpowered insertion of supplies via airdrop from C-130 or C-17 aircraft is prohibitively high risk. Even with recent improvements to airdrop accuracy using guided systems such as the Joint Precision Air Drop System (JPADS), which can be effectively dropped from higher altitudes, range is limited to a maximum glide radius of about thirty miles, which does not enable airdrop delivery in contested airspace with acceptable risk.

There is a need for greater offset range and increased distance between departing the transport airplane and the drop zone in situations of near-peer competition. The need for greater offset coincides with the need for a more dispersed, mobile approach to armed force distribution as a result of increased enemy capacity for precision long range fires. More distributed forces will require a larger number of accurate, autonomous, delivery vehicles.

While powered parafoils have a long history of civilian use, the military's interest is relatively recent and there are currently no powered parafoil cargo delivery systems that meet end-user needs. However, the inventors have found that powered parafoils are well positioned to meet these requirements because compared with conventional fixed-wing or rotary-wing aircraft they have lower cost of acquisition and operation, minimal infrastructure requirements, high degree of modularity and payload flexibility, with positive safety characteristics. They also offer deployment flexibility because they can be launched from transport aircraft, from the ground and from ships at sea, and can also be configured to be able to return to base after they have delivered their cargos to the conflict zone. This flexibility can distribute supplies to multiple locations across a conflict zone from a single, or multiple, launch points across varied terrain and environments with reduced risk and cost.

The present subject matter provides certain benefits to automated air-delivery vehicles, including, for example, adding propulsion to an air deployed ram-air parafoil winged parachute in order to carry a payload beyond unpowered glide range, minimizing the stowed footprint and volume of LRPADS payload, propulsion unit, and guidance unit in order to consume minimal cargo space inside delivery aircraft payload bays, and maintaining stable propulsion unit orientation about pitch, roll, and yaw axis regardless of payload and fuel load center of gravity (CG) variations. The present subject matter also fulfills a need for battlespace aerial delivery systems that are highly mobile, small, numerous, and low-cost and address tyrannies of distance anywhere adversaries may attempt to interrupt military or civil supply operations.

SUMMARY OF THE INVENTION

The present subject matter includes aerial delivery systems including a propulsion unit, a deployable parafoil attached to the propulsion unit, a control/navigation unit operably connected to the parafoil, and a support truss connected to the propulsion unit. In embodiments, the system may be configured to attach to and transport a payload. In embodiments, the propulsion unit may be configured to provide thrust to the aerial delivery system while the parafoil is deployed and the control/navigation unit may be configured to steer the parafoil while deployed.

Embodiments may include a suspension harness configured to hang the payload from the system via a plurality of support members that attach to different locations on the payload and converge to a common point under the propulsion unit.

In embodiments, the control/navigation unit is operably connected to the parafoil via a plurality of risers that attach to different locations on the parafoil and converge to a common point over the propulsion unit.

In embodiments, the support truss is configured to hold the system upright when not attached to a payload.

In embodiments, the control/navigation unit is configured to adjust a length of risers or control lines connected to the parafoil.

In embodiments, the control/navigation unit is configured to turn on the motor after the aerial delivery system is deployed from an aircraft.

In embodiments, the control/navigation unit is configured to turn on the motor after the parafoil is deployed.

In embodiments, the control/navigation unit is configured to turn off the motor prior to landing the aerial delivery system.

In embodiments, the control/navigation unit is configured for autonomous, semi-autonomous, and/or remote control.

In embodiments, the control/navigation unit is configured to guide the system to a geographic location based on GPS, electronic homing, or optical guidance.

In embodiments, the payload is attached to a JPADS pallet.

In embodiments, a footprint of the system is less than 48"×48".

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
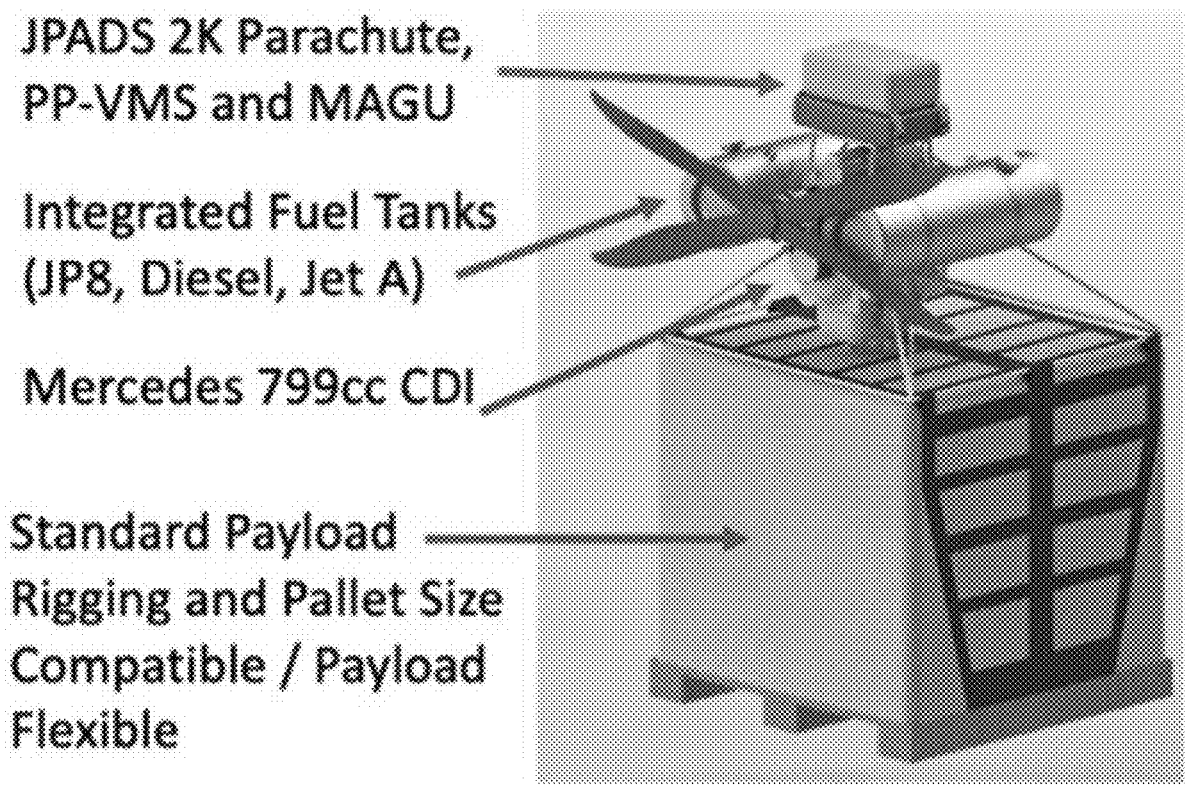
FIG. 1 depicts an exemplary aerial delivery vehicle and payload according to aspects of the disclosure.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a riser" is a reference to one or more risers and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1 depicts an exemplary aerial delivery vehicle and payload according to aspects of the disclosure. As shown in FIG. 1, the undeployed aerial delivery vehicle is attached to a payload via a payload harness that wraps at least partially around the payload and may be connected to a support pallet underneath the payload. In this example, the payload harness may be connected to the rigid truss, which can otherwise support the vehicle when not attached to a payload. The truss may be made, for example, of a metal alloy (like chromoly, etc.) or from some other structural material(s). The truss may be connected to the propulsion unit with sufficient strength to support the payload as the airfoil is deployed, while the vehicle is under canopy, and/or is in powered flight.

The canopy is attached to the propulsion unit, e.g. via risers and/or control lines attached to the canopy. In embodiments, the canopy may be, for example, a ram-air parachute or parafoil. The risers and/or control lines of the canopy may be connected to a guidance/control unit that is configured to process various information, such as real-time navigation information, and to execute control commands, such as adjusting control lines to steer the vehicle and/or trim the parafoil, etc. The guidance/control may be configured to navigate the vehicle autonomously, semi-autonomously, and/or under manual remote control. This may include, for example, automated navigation to certain geographical location(s), homing on various encrypted or unencrypted signals, optical recognition, etc. Additional information processing and controls may also be included, such as propulsion controls that control engine and/or prop speed, turn on the motor when the vehicle or canopy are deployed, turn off the motor before the vehicle lands (e.g. based on AGL readings), and/or other functional controls that may be adapted to the payload (such as aiming and/or fire controls for kinetic payloads, release controls for deployable payloads, etc.).

The propulsion unit may include various forms of motors, such as diesel, gas, electric, etc. In the example shown in FIG. 1, the vehicle includes a 799 cc CDI diesel engine. A propeller, which may take various forms, is attached to the motor. In this example, the propeller blades are shown with unequal spacing, which may provide, for example, reduced noise signatures. Propellers with separation angles of, for example, 15° to 30° may be used. The propeller may be adjustable in various ways, e.g. to allow the blades to be closed when not in use and opened when the motor is running, which may be helpful, for example, in reducing the risk of damaging the propeller or the canopy becoming fowled during deployment and/or landing.

Figure 2:
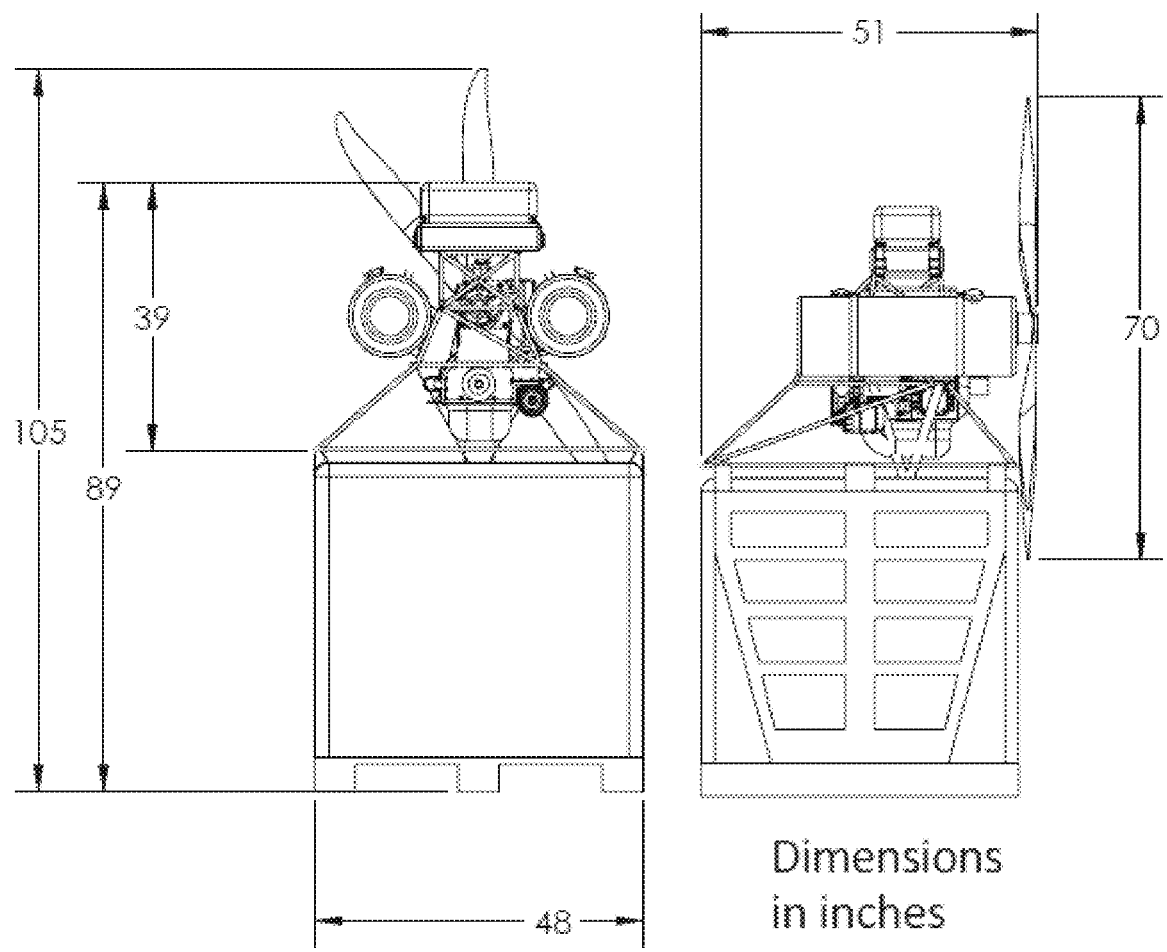
FIG. 2 depicts an exemplary aerial delivery vehicle and payload according to aspects of the disclosure.

FIG. 2 depicts an exemplary aerial delivery vehicle and payload according to aspects of the disclosure. As shown in FIG. 2, various exemplary dimensions (in inches) for the height of the propulsion unit, the combined vehicle, the propeller, etc. are provided. Significantly, the "footprint" of the propulsion unit and truss may be configured to approximate the standard dimensions of payload pallets (e.g., 48"× 48" or less).

Figure 3:
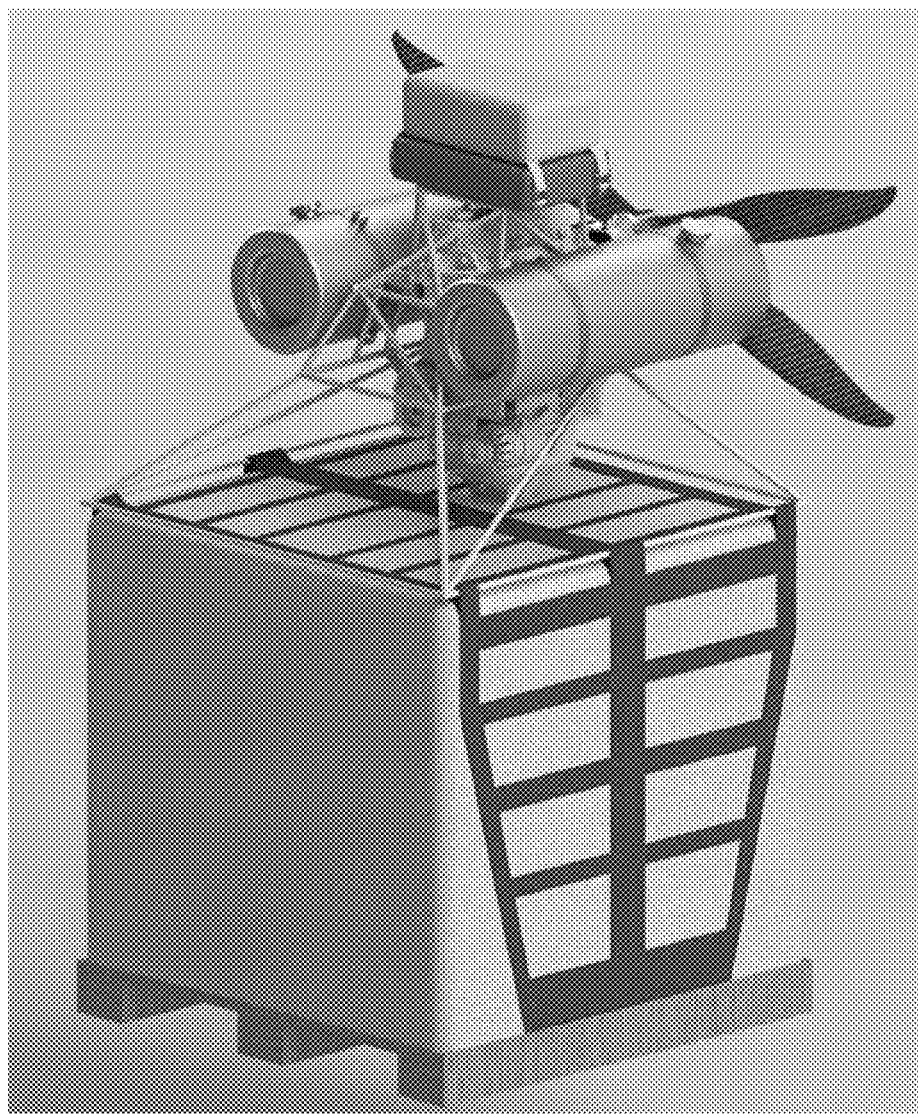
FIG. 3 is a front isometric view of an exemplary aerial delivery vehicle and payload according to aspects of the disclosure.

FIG. 3 is a front isometric view of an exemplary aerial delivery vehicle and payload according to aspects of the disclosure. As shown in FIG. 3, the propulsion system may include its own fuel tanks, also carried within the overall footprint of the propulsion unit, as well as additional rigid supports attached to the truss that form a cage within which the motor can be mounted/secured. FIG. 3 also shows how the truss can be attached to, for example, webbing that constrains/supports the payload. Other attachment means are also possible, including additional embodiments discussed below.

Figure 4:
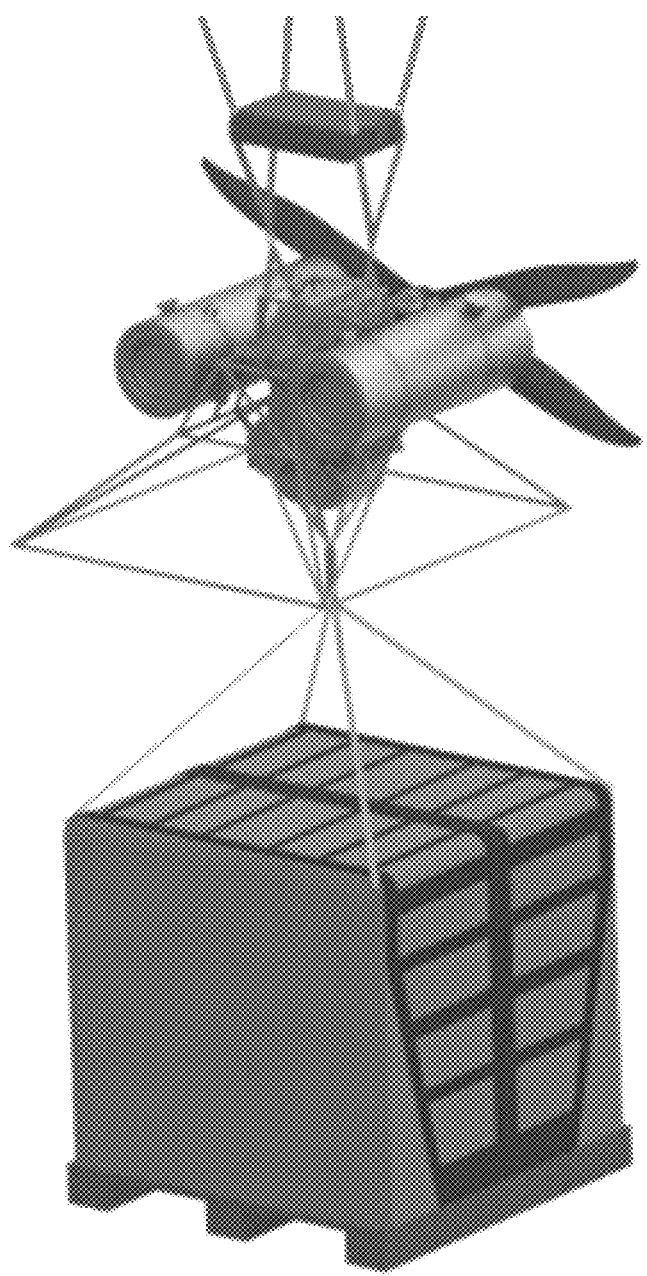
FIG. 4 is a front isometric view of an exemplary aerial delivery vehicle and payload, while under canopy and including a standoff support, according to aspects of the disclosure.

FIG. 4 is a front isometric view of an exemplary aerial delivery vehicle and payload, while under canopy and including a standoff support/suspension, according to aspects of the disclosure. As shown in FIG. 4, the overall structure shares similarities to the embodiments shown in FIGS. 1-3, such as propulsion unit, the rigid truss, the guidance/control unit, the parafoil (not shown), and the payload harness. However, in this embodiment a standoff support/suspension is included that attaches the payload to the propulsion unit.

Figure 5:
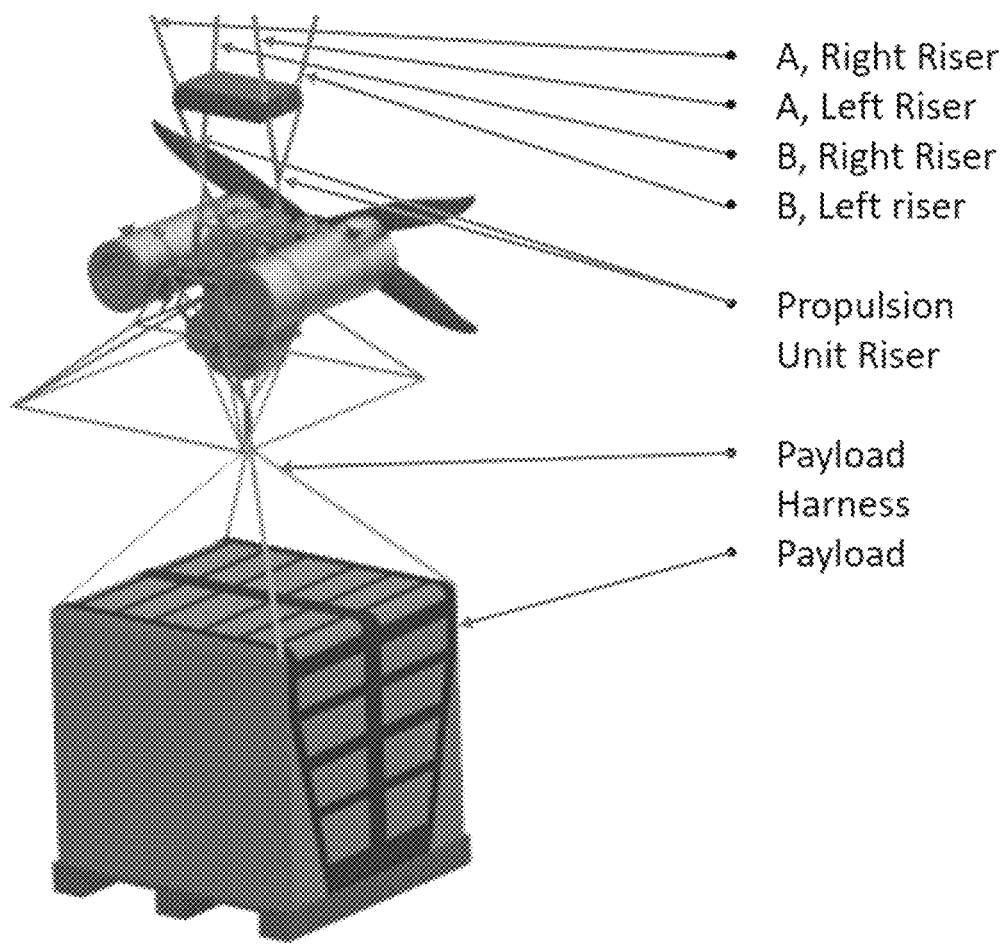
FIG. 5 depicts additional details of the exemplary aerial delivery vehicle and payload shown in FIG. 4.

FIG. 5 depicts additional details of the exemplary aerial delivery vehicle and payload shown in FIG. 4. As shown in FIG. 5, a guidance/control unit is attached to the parafoil wing using the wings A, B, left, and right risers. The propulsion unit is attached to the guidance/control unit using two separate left and right risers. This can help constrain the propulsion unit about the yaw axis, as the propulsion unit risers are under tension, they will tend not to allow any rotation or twist about the yaw axis. Each left and right harnesses have a single confluence point. This ensures that the guidance unit pitch axis is isolated from any fore and aft CG shifts or oscillations about the propulsion unit pitch axis, which is critical to maintaining parafoil angle of attack as designed.

The payload is attached using a harness consisting of 4 attach points near the bottom of the propulsion unit and the harness proceeds down towards the payload with a single confluence point. This ensures that the payload CG has little to no effect on the propulsion unit orientation about the Pitch and Roll axis.

Figure 6:
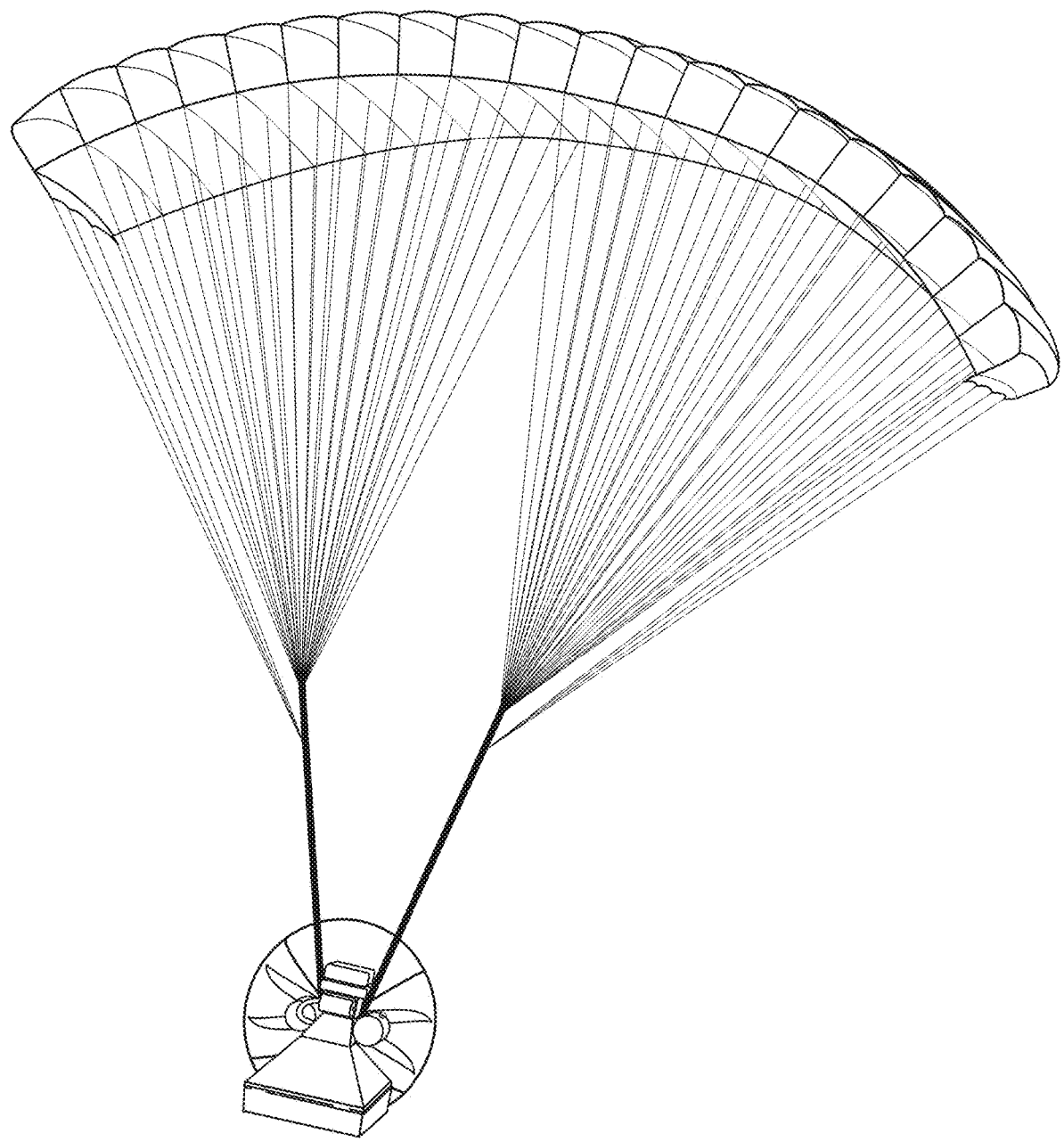
FIG. 6 is a photograph of an exemplary aerial delivery vehicle and payload, while under canopy and in powered flight, according to aspects of the disclosure.

FIG. 6 is a photograph of an exemplary aerial delivery vehicle and payload, while under canopy and in powered flight, according to aspects of the disclosure. As shown in FIG. 6, this embodiment includes a shroud around the propeller, which can be beneficial, for example, in reducing the risk of damaging the propeller or the canopy becoming fowled during deployment or landing. As can also be seen in FIG. 6, the guidance/control unit is capable of turning the vehicle by adjusting control lines and/or risers that adjust the shape/control surfaces of the parafoil. It is noted that, although the example shown in FIG. 6 includes a propulsion unit attached to a pallet structure that does not include a further payload, the principles of operation and components may be otherwise the same as those previously described.

Figure 7:
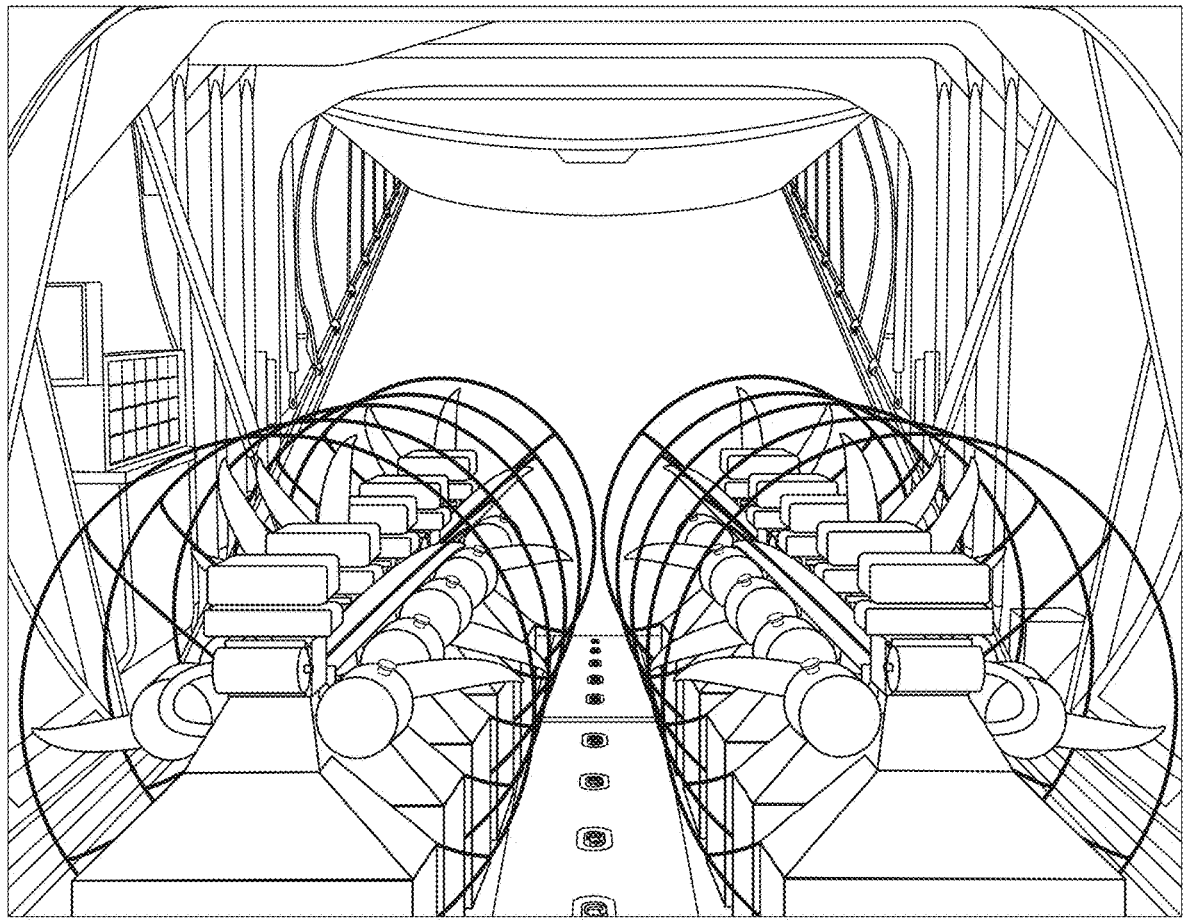
FIG. 7 is a photograph of exemplary aerial delivery vehicles prepared for mass deployment, according to aspects of the disclosure.

FIG. 7 is a photograph of exemplary aerial delivery vehicles prepared for mass deployment, according to aspects of the disclosure. As shown in FIG. 7, a large number of vehicles may be stowed in the back of an aircraft having a ramp at the tail. The standardized form factor enhances the organized stowage and deployment of the vehicles from the aircraft ramp.

Figure 8:
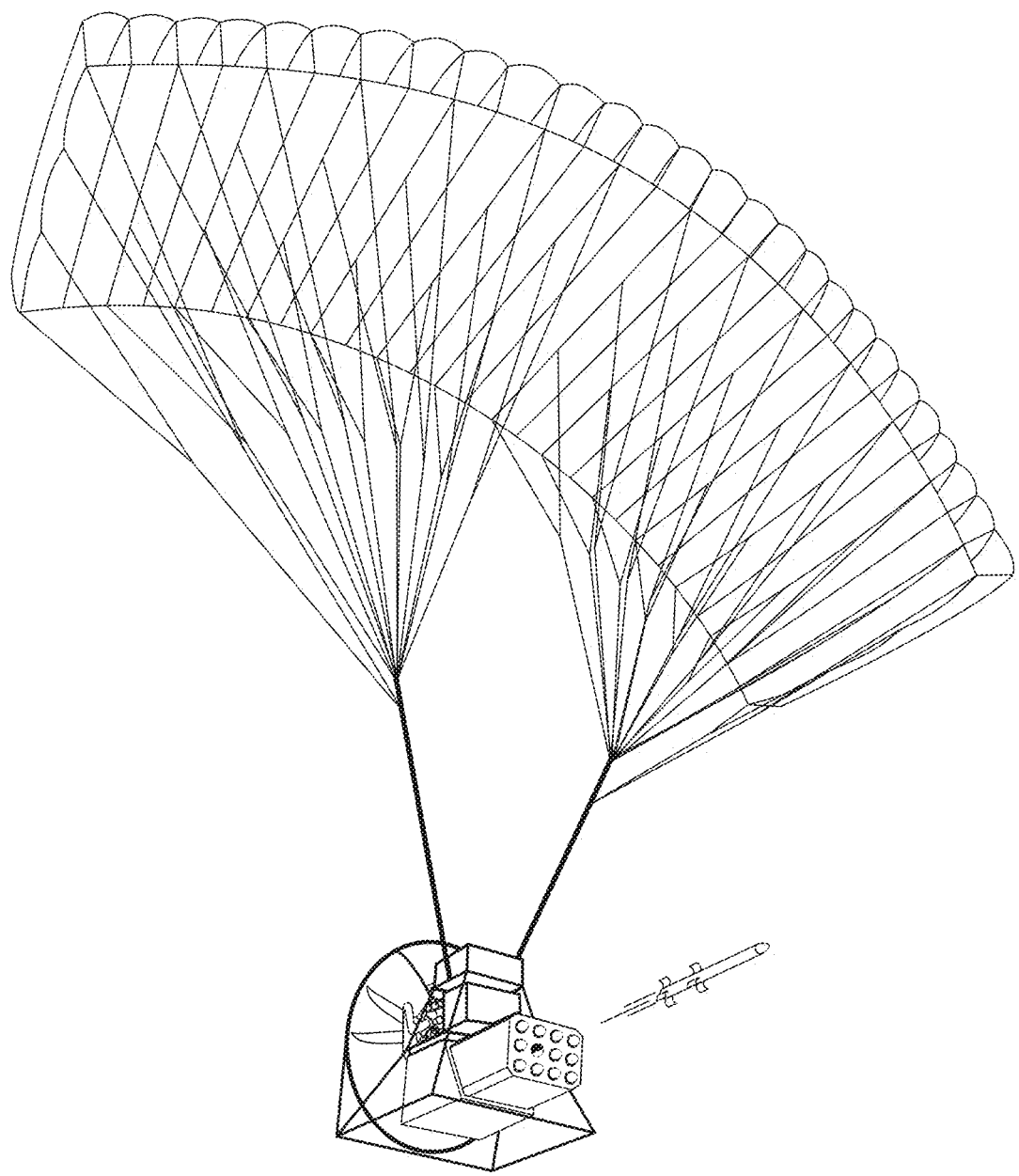
FIG. 8 depicts an exemplary aerial delivery vehicle and kinetic payload according to aspects of the disclosure.

FIG. 8 depicts an exemplary aerial delivery vehicle and kinetic payload according to aspects of the disclosure. As shown in FIG. 8, the vehicle may be attached to or otherwise configured to control a kinetic payload, such as missiles, rockets, or other munitions that the guidance/control can target and fire autonomously, semi-autonomously, and/or under manual remote control. The payload and/or vehicle may also include various automated countermeasure systems, similar to those used on combat aircraft, such as chaff, flares, active jamming, etc. The guidance/control may also be configured to activate such countermeasures autonomously, semi-autonomously, and/or under manual remote control.

Exemplary units according to aspects of the invention may have, for example, a range of 320 miles with an operational payload of up to 350 pounds, in a very low-cost, highly flexible air drop cargo delivery platform for small unit resupply, and other tasks, including as an economical training and testing platform.

In certain configurations, e.g. using 1 or 2 thousand pound rated parafoils, a very low acquisition price ca be achieved, with direct operating costs of under $20/hour, making such options viable for a number of non-military public safety, remote infrastructure, and expeditionary support applications around the world.

In embodiments, the vehicle may include various other components, which may even further enhance the independent capabilities of the aerial delivery vehicle. For example, various navigation systems known in the art may be included to allow autonomous, semi-autonomous and/or manual control of the vehicle when under canopy and/or in powered flight.

In such systems such as those described above, the thrust may be provided by various means including engine-driven propellers as well as other means of delivering focused thrust (such as steerable fans, fluidic propulsion, etc.) and the lift is provided by the parafoil.

In addition to carrying bulk cargos LRPADS capabilities also lend themselves to several other mission categories and mission-specific configurations. A Powered Parafoil Munitions Delivery System (PP-MDS) can add capability for launching munitions from common launch tubes. A Powered Parafoil Reconnaissance and Surveillance Platform (PP-RSP) can add sensor payloads, that can include EO/IR cameras, SIGINT, targeting, jamming, synthetic aperture radars and serve as communications relay nodes in a mesh network. LRPADS can also be configured to serve as Powered Parafoil Self-propelled Electrical Power Generation (PP-SPEG) units, with a JPADS 2K capable of producing 60 kW of power and delivering fuel for over 20 hours of continuous operation.

Combined sorties of PP-MDS, PP-RSP, and cargo-delivery variant "teams" may also be configured or otherwise controlled to work together to provide information, strike capability, and cargo deliveries. These swarms, with different payloads—kinetic, ISR, and cargo-which will all look very similar visually and by radar signature may present adversaries with multiple dilemmas regarding how to effectively respond with economy of force.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. An aerial delivery system, comprising:
a propulsion unit including a motor;
a deployable parafoil attached to the propulsion unit;
a control/navigation unit operably connected to the parafoil; and
a support truss connected to the propulsion unit,
wherein, the system is configured to attach to and transport a payload,
the propulsion unit is configured to provide thrust to the aerial delivery system while the parafoil is deployed,
the control/navigation unit is configured to steer the parafoil while deployed,
the aerial delivery system is configured to be deployed from an aircraft with, and attached to the payload, and
the control/navigation unit is configured to turn on the motor after the aerial delivery system is deployed from the aircraft.

2. The aerial delivery system of claim 1, further comprising a suspension harness configured to hang the payload from the system via a plurality of support members that attach to different locations on the payload and converge to a common point under the propulsion unit.

3. The aerial delivery system of claim 1, wherein the control/navigation unit is operably connected to the parafoil via a plurality of risers that attach to different locations on the parafoil and converge to a common point over the propulsion unit.

4. The aerial delivery system of claim 1, wherein the support truss is configured to hold the system upright when not attached to the payload.

5. The aerial delivery system of claim 1, wherein the control/navigation unit is configured to adjust a length of risers or control lines connected to the parafoil.

6. The aerial delivery system of claim 1, wherein the control/navigation unit is configured to turn on the motor after the parafoil is deployed.

7. The aerial delivery system of claim 1, wherein the control/navigation unit is configured to turn off the motor prior to landing the aerial delivery system.

8. The aerial delivery system of claim 1, wherein the control/navigation unit is configured for autonomous, semi-autonomous, and/or remote control.

9. The aerial delivery system of claim 1, wherein the control/navigation unit is configured to guide the system to a geographic location based on GPS, electronic homing, or optical guidance.

10. The aerial delivery system of claim 1, wherein the payload is attached to a JPADS pallet.

11. The aerial delivery system of claim 1, wherein a footprint of the system is less than 48"×48".

12. The aerial delivery system of claim 1, wherein the control/navigation unit is configured to target and/or launch a munition carried by the system.

13. The aerial delivery system of claim 1, wherein the payload is suspended from the support truss via at least four harness straps that attach to the payload at different points, and converge to a common attachment point below the support truss.

14. An aerial delivery system, comprising:
a propulsion unit including a motor;
a deployable parafoil attached to the propulsion unit;
a control/navigation unit operably connected to the parafoil;
a support truss connected to the propulsion unit;
wherein, the system is configured to attach to and transport a payload,
the propulsion unit is configured to provide thrust to the aerial delivery system while the parafoil is deployed,
the control/navigation unit is configured to steer the parafoil while deployed,
the aerial delivery system is configured to be deployed from an aircraft with, and attached to, the payload, and
the support truss is configured to suspend the payload via at least four harness straps that attach to the payload at different points, and converge to a common attachment point below the support truss.

15. The aerial delivery system of claim 14, wherein the control/navigation unit is configured to adjust a length of risers or control lines connected to the parafoil.

16. The aerial delivery system of claim 14, wherein each of the four harness straps is configured to attach to different corners of the payload.

17. An aerial delivery system, comprising:
a propulsion unit including a motor;
a control/navigation unit operably connected to the propulsion unit via a plurality of first risers;
a deployable parafoil operably connected to the control/navigation unit via a plurality of second risers;
a support truss connected to the propulsion unit; and
a suspension harness configured to hang a payload from the support truss,
wherein, the propulsion unit is configured to provide thrust to the aerial delivery system while the parafoil is deployed,
the control/navigation unit is configured to steer the parafoil while deployed via the plurality of second risers, and
the aerial delivery system is configured to be deployed from an aircraft with, and attached to, the payload.

18. The aerial delivery system of claim 17, wherein the support truss is configured to suspend the payload via at least four harness straps that attach to the payload at different points, and converge to a common attachment point below the support truss.

19. The aerial delivery system of claim 18, wherein each of the four harness straps is configured to attach to different corners of the payload.

20. The aerial delivery system of claim 17, wherein a footprint of the system is less than 48"×48".

\* \* \* \* \*